(No Model.)

W. MARTIN.
PIPE COUPLING

No. 268,917. Patented Dec. 12, 1882.

WITNESSES
A. J. Noble
D. S. Thompson

INVENTOR
William Martin

Attorney

UNITED STATES PATENT OFFICE.

WILLIAM MARTIN, OF TIDIOUTE, PENNSYLVANIA.

PIPE-COUPLING.

SPECIFICATION forming part of Letters Patent No. 268,917, dated December 12, 1882.

Application filed May 1, 1882. (No model.)

*To all whom it may concern:*

Be it known that I, WILLIAM MARTIN, a citizen of the United States, residing at Tidioute, in the county of Warren and State of Pennsylvania, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a flexible coupling for steam and other pipes, which shall be safe and reliable in action, and at the same time be self-lubricating, and adapted to be readily adjusted to compensate for the wear of the parts, whereby a tight joint may at all times be provided and the escape of steam or liquids be prevented; and to this end my invention consists of a pipe on the end of which is rigidly or detachably secured a globe or sphere, through the center of which there is a hole or perforation to conform or not to the internal diameter of the pipe; also, a socket or hemispherical shell, which fits over the end of the globe and terminates at the outer end in a pipe or extension, to which other pipes or tubes may be attached to form a conduit of any desirable length, combined with and incased in a hollow divided globe adapted to be adjusted on the stem of ball or sphere, as will more fully hereinafter appear.

Figure 1:
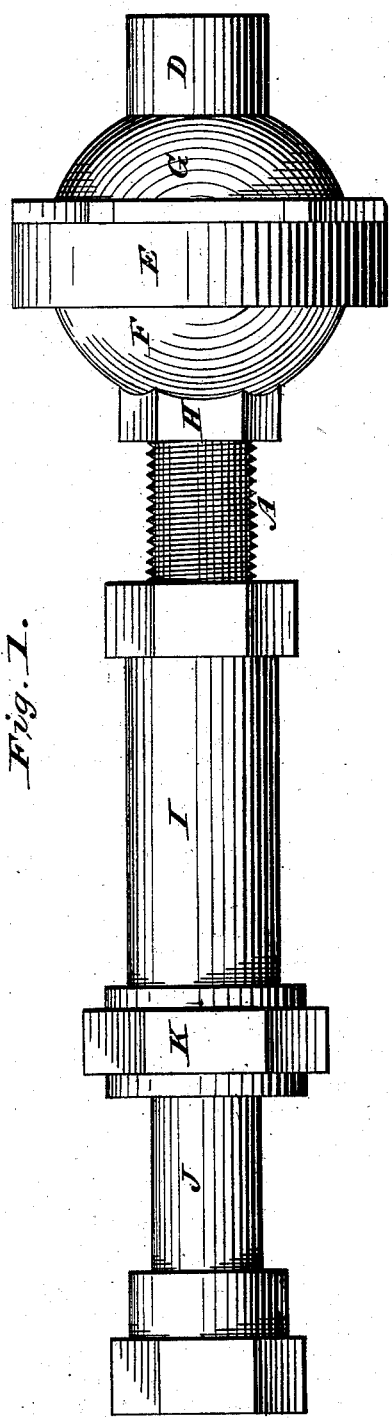
Figure 2:
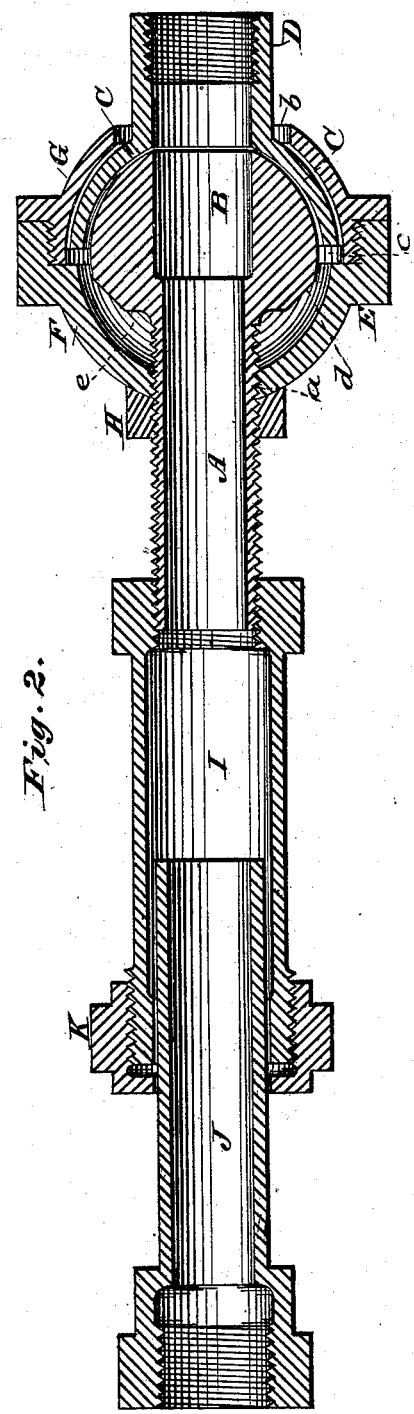

Figure 1 is a plan view. Fig. 2 is a longitudinal sectional view of Fig. 1.

It has been found to be very important in many cases in which power is transmitted or in which liquids under pressure are transmitted through tubes to have a joint between the source of power and the moving tube, which joint shall be absolutely tight, while at the same time it can be turned in different directions, so as to allow the fluid or steam under pressure to pass in different directions; and it is to meet these requirements that I have devised the present apparatus.

Referring to the drawings, A is a tube with a screw-thread formed on its external surface. At one end of this tube is secured, either rigidly or detachably, a perforated sphere or globe, B.

C is a socketed or hemispherical shell, adapted to fit snugly over the ball or globe B, and thereby form a steam or water tight seat. It terminates in a pipe or tube extension, D, adapted to be coupled to adjacent sections of pipe or hose in the usual manner.

E is a hollow globe or sphere, divided into two sections at its center, and provided with a square or other shaped screw-thread for securing the parts together. Section F of the hollow sphere E is provided with a screw-threaded perforation, $a$, which meshes with the screw-threads on the tube A. The section G of the hollow sphere E is provided with a ground surface inside to fit snugly over the outside surface of the hemispherical shell C, so as to give said shell C a double steam or water seat—one on the ball or globe B, the other against the inside of the section G of the hollow sphere E. Section G of the hollow sphere E is also provided with an opening, $b$, somewhat larger than the pipe or extension D of the shell C, so as to admit of the extension D being placed at varying angles and allow the shell C to play on the ball or globe B. The shell C is shorter than the section G, so that a space, $c$, is provided between the shell C and section F, which allows the shell C to move about or occupy varying positions in relation to the globe or ball B. The globe or ball B is cut away behind, as shown at $d$; or section F may be made somewhat elongated at this point, thus forming a cavity or compartment, $c$, between the shell-section F and ball or globe B for the purpose of holding any suitable lubricant for keeping the working parts which come in frictional contact properly oiled.

H is a stuffed nut, adapted to be screwed on the pipe-section A and to impinge on section F of the hollow sphere E, so as to securely hold the same when screwed into position and prevent it from leaking oil.

It will be apparent that by loosening the stuffed nut H and turning the globe or shell E the shell or hemisphere C can be made to work loose or tight on the globe B and inside surface of section G of hollow sphere E, and thus make a tight or loose joint, while at the same time, should the parts be worn away by frictional contact or become loose, so as to leak, the same can be remedied by turning or screwing the hollow sphere E down.

My device is specially adapted for the conveyance of steam from the locomotive-engine to the cars of a train for heating purpose; but I do not confine this invention to that particular use, as it is obvious that it can be used to advantage wherever a globe-joint or a flexible steam-coupling is required.

The expansion-joint consists of a tube-section, I, of larger diameter than the section A, to which it is secured, and in which a smaller tube-section, J, is free to play back and forth. The section I is provided with a stuffing-box, K, by which the escape of steam or liquids is prevented at this point, as is common in this class of compensating-joints.

I do not claim to be the inventor of this expansion-joint, consisting of the parts I, K, and J; but its application to my car-coupler for steam is an entirely new use for it, so I have described it as it is in my drawings.

Having described my invention, what I claim, and desire to secure by Letters Patent, is—

1. In a pipe-coupling, a pipe, A, provided with a ball, B, and a pipe, D, provided with a hemispherical shell, C, combined with an incasing shell and a nut, H.

2. In a pipe-coupling, a screw-threaded pipe, A, having a ball, B, and a pipe, D, having a hemispherical shell, C, combined with a divided incasing shell, F G, and a nut, H.

3. A pipe-coupling composed of the pipe A, provided with ball B, the pipe D, provided with hemispherical shell C, and the divided incasing shell F G, the ball being beveled in the rear, whereby an oil-chamber is provided, substantially as set forth.

In testimony whereof I affix my signature in presence of two witnesses.

WILLIAM MARTIN.

Witnesses:
D. S. THOMPSON,
A. J. NOBLE.